United States Patent
Sasaki

(10) Patent No.: US 6,640,025 B2
(45) Date of Patent: Oct. 28, 2003

(54) OPTICAL APPARATUS FOR OPTICAL COMMUNICATION TERMINAL AND OPTICAL COMMUNICATION SYSTEM

(75) Inventor: Hironori Sasaki, Yamanashi (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 63 days.

(21) Appl. No.: 09/880,137

(22) Filed: Jun. 14, 2001

(65) Prior Publication Data

US 2002/0031295 A1 Mar. 14, 2002

(30) Foreign Application Priority Data

Sep. 11, 2000 (JP) .......................................... 2000-274248

(51) Int. Cl.[7] ................................................. G02B 6/28
(52) U.S. Cl. .............................. 385/24; 385/31; 385/34; 359/15
(58) Field of Search .............................. 385/24, 37, 34, 385/31; 359/9, 15, 130

(56) References Cited

U.S. PATENT DOCUMENTS 5,774,239 A * 6/1998 Feldman et al. ................ 359/9
6,069,987 A     5/2000 Sasaki et al.

FOREIGN PATENT DOCUMENTS

JP          10-068808          3/1998

OTHER PUBLICATIONS

"Binary Optics Technology: The Theory and Design of Multi–level Diffractive Optical Elements," G.J. Swanson, *Technical Report 854*, Lincoln Laboratory, MIT, pp. 1–47, 1989.

"Design considerations of stacked multilayers of diffractive optical elements for optical network units in optical subscriber–network applications," Hironori Sasaki, et al., *Applied Optics*, vol. 37, No. 17, pp. 3735–3745, 1998.

* cited by examiner

*Primary Examiner*—Rodney Bovernick
*Assistant Examiner*—Sung Pak
(74) *Attorney, Agent, or Firm*—Rabin & Berdo, P.C.

(57) ABSTRACT

A compact optical apparatus for use in optical communication is provided which can be manufactured at low costs with ease. A common terminal is mounted to receive diverging light with a long wavelength and to output light with a short wavelength, and an input terminal is mounted to receive light with a short wavelength. An output terminal is mounted to transmit light with the long wavelength to a light receiver. A wavelength selecting filter permits the light with the long wavelength to pass to the light receiver and reflects light transmitted from the input terminal so as to selectively direct it to the common terminal. First and second computer-generated hologram devices guide diverging light from the input terminal to the common terminal via the wavelength selecting filter.

9 Claims, 3 Drawing Sheets

OPTICAL APPARATUS FOR OPTICAL COMMUNICATION TERMINAL AND OPTICAL COMMUNICATION SYSTEM

BACKGROUND OF THE INVENTION

1. Field of the Invention

The present invention relates to an optical communication system enabling bidirectional optical communication by using an optical signal having different wavelengths and an optical apparatus for use in optical communication using a computer-generated hologram (hereinafter referred simply as a "CGH device") that can be suitably embedded in the optical communication system.

2. Description of the Related Art

In recent years, in order to implement optical communication at a large communication capacity, a plan called a "Fiber to The Home (FTTH)" to build an optical fiber in each home is in motion. The plan enables unidirectional optical communication achieved by transmission of light having a wavelength, for example, in a 1.55 $\mu$m band from a base station to a home and reverse-directional optical communication achieved by transmission of light having a wavelength, for example, in a 1.31 $\mu$m band from the home to the base station. Therefore, since light having different bands of wavelengths is transmitted in a reverse direction over an optical fiber path built between the base station and the home, each of the optical communication terminals on both the base station and home sides requires an optical apparatus for optical communication to multiplex or demultiplex optical signals having different wavelengths.

Since such the optical apparatus for use in optical communication is configured by using microoptic components including a microlens, optical demultiplexer or a like so as to be made smaller in size, it is necessary to assemble, with high accuracy, many optical parts. Because of this, the conventional optical apparatus for use in optical communication has a problem in that its manufacturing process is complicated and its manufacturing costs increase.

SUMMARY OF THE INVENTION

In view of the above, it is an object of the present invention to provide a novel optical apparatus for use in bidirectional optical communication and a novel optical communication system that can be easily manufactured at reduced costs and can be made compact.

According to a first aspect of the present invention, there is provided an optical apparatus for use in bidirectional optical communication including:

a common terminal used to receive diverging light with a long wavelength and to output light with a short wavelength which is shorter than the long wavelength;

an input terminal used to receive diverging light with the short wavelength from a light source;

an output terminal used to send out the diverging light with the long wavelength to a light receiver;

a wavelength selecting filter adapted to cause the light with the long wavelength transmitted from the common terminal to pass toward the light receiver and to reflect the light with the short wavelength transmitted from the input terminal to selectively direct the light to the common terminal;

first and second CGH devices used to guide the diverging light transmitted from the input terminal to the common terminal via the wavelength selecting filter and to cause the diverging light to converge to the common terminal, wherein the second CGH device causes the diverging light with the long wavelength transmitted from the common terminal to converge to the light receiver.

Thus, the present invention basically uses the CGH device based on an optical diffractive phenomenon as the optical element employed in the optical apparatus to implement bidirectional optical communication using light having different wavelength. By configuring above, it is possible to provide a fine CGH device with optical characteristics such as collimation function and light-gathering function as seen in the case of optical lens and with deflection function as seen in the case of a prism.

In the foregoing, a preferable mode is one wherein the first CGH device has a function of converting the diverging light with the short wavelength into a parallel luminous flux and of deflecting it, and wherein the second CGH device is optimized so as to deflect the parallel luminous flux converted from the light with the short wavelength toward the common terminal and to cause the parallel luminous flux to converge to the common terminal.

According to a second aspect of the present invention, there is provided an optical apparatus for use in bidirectional optical communication including:

a common terminal used to receive diverging light with a short wavelength and to output light with a long wavelength which is longer than the short wavelength;

an input terminal used to receive diverging light with the long wavelength from a light source;

an output terminal used to send out the diverging light with the short wavelength to a light receiver;

a wavelength selecting filter adapted to cause the light with the short wavelength transmitted from the common terminal to pass toward the output terminal and to reflect the light with the long wavelength transmitted from the input terminal to selectively direct the light to the common terminal;

first and second CGH devices used to guide the diverging light transmitted from the input terminal to the common terminal via the wavelength selecting filter and to cause the light to converge;

a third CGH device used to cause the light with the short wavelength transmitted from the common terminal through the second CGH device to converge to the output terminal.

In the foregoing, a preferable mode is one wherein the first CGH device has a function of converting the diverging light of the long wavelength into a parallel luminous flux and deflecting it, and wherein the second CGH device is optimized so as to deflect the parallel luminous flux converted from the light with the long wavelength toward the common terminal and to cause the light to converges and wherein the diverging light with the short wavelength transmitted from the common terminal, after having been dispersed by the second CGH device, is converged to the light receiver by the third CGH device.

According to a third aspect of the present invention, there is provided an optical communication system implementing bidirectional communication between a base station and a home and wherein the base station is provided with the optical apparatus stated in the second aspect and the home is provided with the optical apparatus stated in the first aspect and both of the common terminals of the optical apparatuses are connected through an optical fiber to each other.

The optical apparatus according to the present invention may include an optical block. The common terminal and the input terminal may be formed on one end of the block respectively and the output terminal may be formed on the other end of the block. The wavelength selecting filter may be mounted on or provided in the block.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

Embodiment

Figure 1:
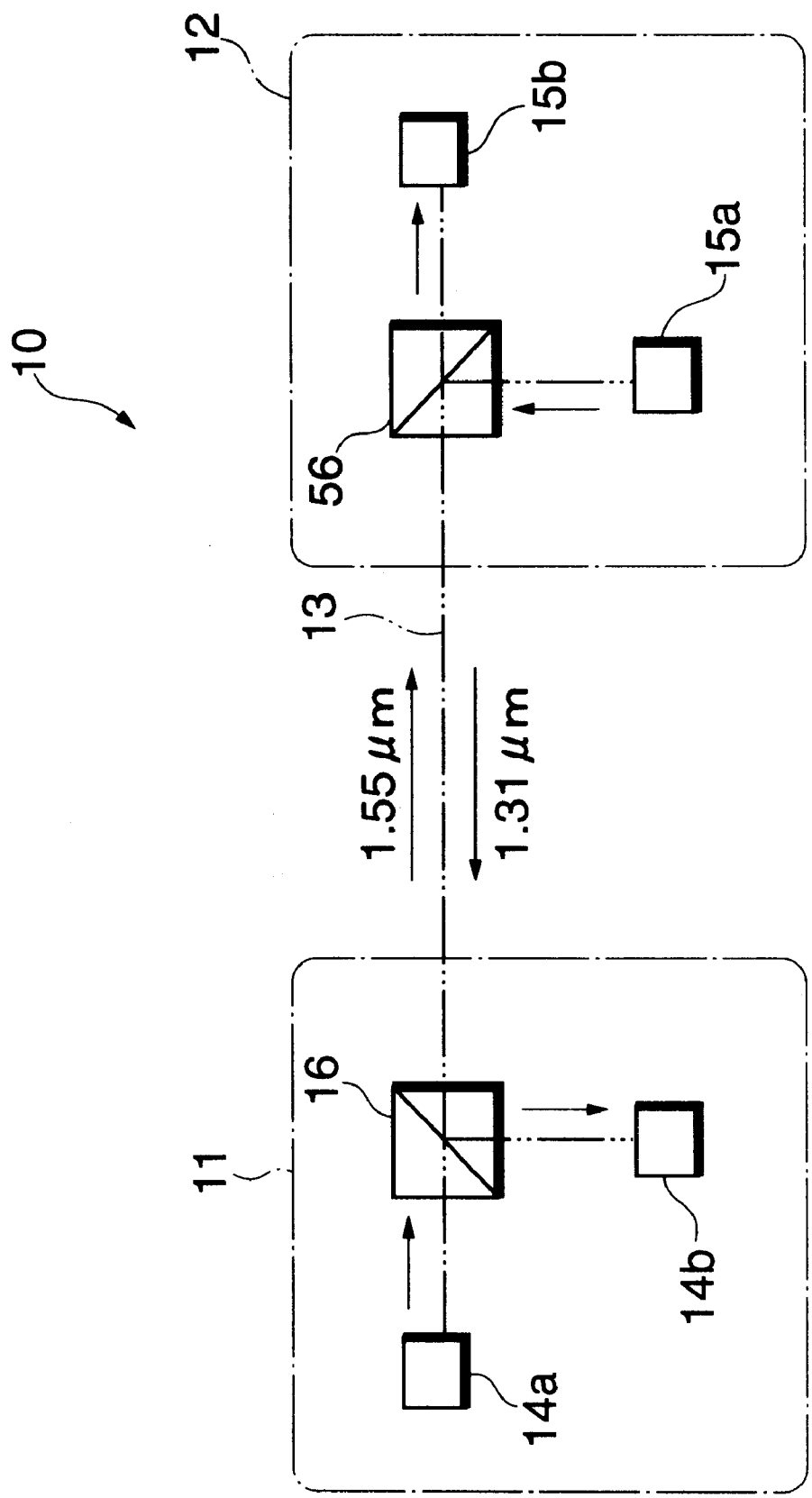
FIG. 1 is a schematic block diagram showing configurations of an optical communication system using an optical apparatus for use in optical communication according to one embodiment of the present invention.

FIG. 1 is a schematic block diagram showing configurations of an optical communication system using an optical apparatus for use in optical communication according to an embodiment of the present invention. The optical communication system 10 of the embodiment is based on an ATM (Asynchronous Transfer Mode) in which signals are transferred in a cell format. In the optical communication system 10 of the embodiment, a base station 11 is connected to a home 12 over a communication path made up of an optical fiber 13. Signal light having a wavelength of, for example, 1.55 μm emitted from a light source 14a is transmitted from the base station 11 to the home 12 through the optical fiber 13. Moreover, signal light having a wavelength of, for example, 1.31 μm emitted from a light source 15a is transmitted from the home 12 to the base station 11 through the optical fiber 13.

As the light sources 14a and 15a, a light emitting device such as an LED (Light Emitting Diode), a semiconductor laser or a like can be used which can send out modulated light signals to the optical fiber 13 in the ATM cell format. Not only these light emitting devices but also conventionally well-known various optical signal output devices can be used as the light sources 14a and 15a.

The base station 11 is equipped with a light receiver 14b such as a photodiode used to receive the signal light, that is, the signal light having a short wavelength transmitted from the home 12. The home 12 is also equipped with a light receiver 15b such as the photodiode used to receive the signal light, that is, the signal light having a long wavelength transmitted from the base station 11.

The base station 11 is provided with an optical apparatus 16 as a terminal equipment used to multiplex and demultiplex the optical signals having two kinds of wavelengths transmitted through the optical fiber 13. Also, the home 12 is provided with an optical apparatus 56 as a terminal equipment used to multiplex and demultiplex the optical signals having two kinds of wavelength transmitted through the optical fiber 13.

Figure 2:
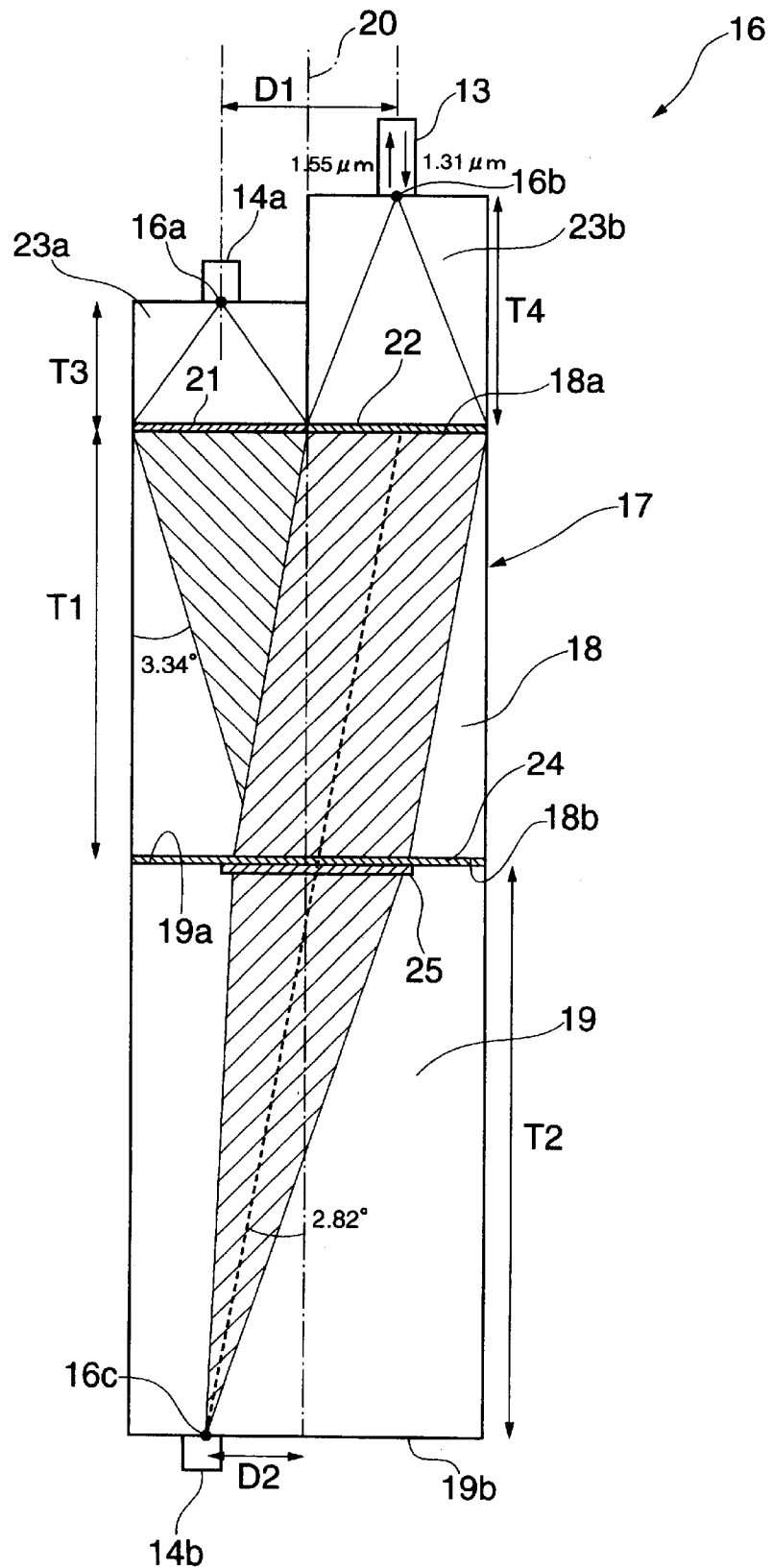
FIG. 2 is a cross-sectional view of a terminal optical apparatus provided to a base station.

FIG. 2 is a cross-sectional view of the optical apparatus 16 provided to the base station 11. The terminal optical apparatus 16, as shown in FIG. 2, is provided with an optical block 17 composed of stacks of optical substrates such as glass. The optical block 17 is constructed of stacks of a silica glass plate 18 with a thickness T1 of, for example, 3 mm and a silica glass plate 19 with a thickness T2, for example, 5 mm. A reference number 20 is assigned to a central axis line in a longitudinal direction of the optical block 17 which passes through a center of the silica glass plates 18 and 19 in a direction of thickness of these two glass plates 18 and 19.

On one surface 18a of the silica glass plate 18 are formed a first CGH device 21 and a second CGH device 22. The first CGH device 21 is formed on one of halves of the surface 18a of the silica glass plate 18, which are demarcated by a central surface including the central axis line, and the second CGH device 22 is formed on the other of the halves of the surface 18a of the silica glass plate 18. On the one surface of halves of surface 18a of the silica glass plate 18 is formed a support section 23a defining an input terminal 16a of the optical apparatus 16 in a manner such that it covers the first CGH device 21. On the other of the halves of the surface 18a of the silica glass plate 18 is formed a support section 23b defining a common terminal 16b of the optical apparatus 16 in a manner such that it covers the second CGH device 22.

Both the support sections 23a and 23b are made up of optical substrates being similar to the silica glass plates 18 and 19. In the example shown in FIG. 2, the support section 23a has a thickness T3 of, for example, 0.75 mm used to guide diverging light of a long wavelength being incident on an input terminal 16a from the light source 14a disposed on an end portion of the support section 23a to the first CGH device 21 and the support section 23b has a thickness T4 of, for example, 1.5 mm used to guide diverging light of a short wavelength being incident on the common terminal 16b from the optical fiber 13 connected to an end portion of the support section 23b to the second CGH device 22. In the example shown in FIG. 1, a distance D1 between center portions of the input terminal 16a and the common terminal 16b is, for example, 350 μm.

On the other surface 18b of the silica glass plate 18 is formed a wavelength selecting filter 24. The wavelength selecting filter 24 reflects the light having a long wavelength transmitted through the first CGH device 21 from the light source 14a toward the second CGH device 22 and permits the light of a short wavelength transmitted through the second CGH device 22 to pass. The wavelength selecting filter 24 is made up of a WDM (Wavelength Division Multiplexing) filter composed of, for example, a dielectric layer.

On one surface 19a of the glass plate 19, that is, on the one surface 19a junctioned to the other surface 18b of the glass plate 18, is formed a third CGH device 25 used to direct the light of a short wavelength having passed through the wavelength selecting filter 24 to an surface 19b of the glass plate 19, for example, to an output terminal 16c placed by a distance D2 far from the central axis line 20. On the output terminal 16c is placed, by a distance D2 far from the central axis line 20, the light receiver 14b used to receive the light of a short wavelength transmitted through the wavelength selecting filter 24 and the third CGH device 25.

Each of the CGH devices 21, 22 and 25 is fabricated with high accuracy by performing well-known photoetching and photolithography on the surfaces 18a and 19a of the glass plates 18 and 19 so as to be made compact.

To manufacture the CGH device, CAD (Computer-aided design) technology as disclosed in Japanese Patent Application No. Hei 9-115272, in which an optical phase difference function in a hologram exhibiting desired diffractive optic characteristics is calculated for each of the CGH devices. By incorporating a phase difference coefficient calculated from the phase difference function into a "Cgh CAD program" operated by, for example, NIPT Corporation in California, U.S.A, a pattern of a photolithography mask required for obtaining a desired shape using photolithography technology is created. By producing the mask based on the above mask pattern and by performing etching processing on the optical substrate using photolithography technology, the CGH device exhibiting desired diffractive optic characteristics, that is, the computer-generated hologram can be obtained.

The first CGH device 21 is provided with diffractive optic characteristics including a collimation function adapted to convert diverging light with a wavelength of 1.55 μm into parallel luminous flux and a deflection function adapted to direct the collimated parallel luminous flux to the second CGH device 22 via the wavelength selecting filter 24. Thus, in the example shown in FIG. 2, the light with the wavelength of 1.55 μm has a deflecting angle of 3.34° with respect to its optical axis.

The second CGH device 22 has a deflecting function of directing collimated light with a wavelength of 1.55 μm to the common terminal 16b and a light-gathering function of gathering light at the common terminal 16b.

Therefore, the light with the wavelength of 1.55 μm emitted from the light source 14a, that is, the signal light having a long wavelength, passes through the first CGH device 21, wavelength selecting filter 24 and second CGH device 22 and is gathered at the common terminal 16b and is guided to the optical fiber 13.

Since the second CGH device 22 is provided with the optical characteristic to cause the parallel luminous flux with the wavelength of 1.55 μm to converge to the common terminal 16b, when the diverging light with the wavelength of 1.31 μm emitted from the optical fiber 13, that is, the signal light having the short wavelength is guided through the common terminal 16b to the second CGH device 22, it does not become a parallel luminous flux, unlike in the case of the signal light having the long wavelength and is directed to the wavelength selecting filter 24 as the diverging light that spreads slightly and, in the example shown in FIG. 2, the light with the wavelength of 1.31 μm has a deflecting angle of 2.82° relative to the optical axis and thus transmits through the wavelength selecting filter 24.

The third CGH device 25 has a light-gathering function of gathering the diverging light transmitting through the wavelength selecting filter 24 at the output terminal 16c.

Therefore, as described above, the optical apparatus 16 of the present invention can properly guide the signal light having the long wavelength emitted from the source light 14a to the optical fiber 13 and can properly guide the signal light having the short wavelength from the optical fiber 13 to the light receiver 14b. Moreover, since the optical device having the light gathering function to gather signal light and the deflecting function of deflecting light is made up of the CGH device, it is made possible to implement the optical apparatus 16 being compact and economical.

In the above example in which the first CGH device 21 and the second CGH device 22 are used in combination, in order to gather diverging light from the input terminal 16a toward the common terminal 16b using the CGH devices 21 and 22, the first CGH device 21 is provided with the collimation function and the deflection function and the second CGH device 22 is provided with the deflection function to deflect the parallel luminous flux toward the common terminal 16b and to gather the parallel luminous flux to the common terminal 16b. Moreover, by combining optic functions of both the CGH devices 21 and 22, the diverging light from the input terminal 16a can be gathered toward the common terminal 16b.

Though, due to the optic characteristic of the second CGH device 22 regarding the signal light with the long wavelength, a slight change in optic characteristics of the second CGH device 22 regarding the signal light with the short wavelength occurs, the change can be corrected by giving a suitable change to the optic characteristics of the third CGH device 25, thereby making it possible to cause the signal light of the short wavelength to converge to the output terminal 16c.

Figure 3:
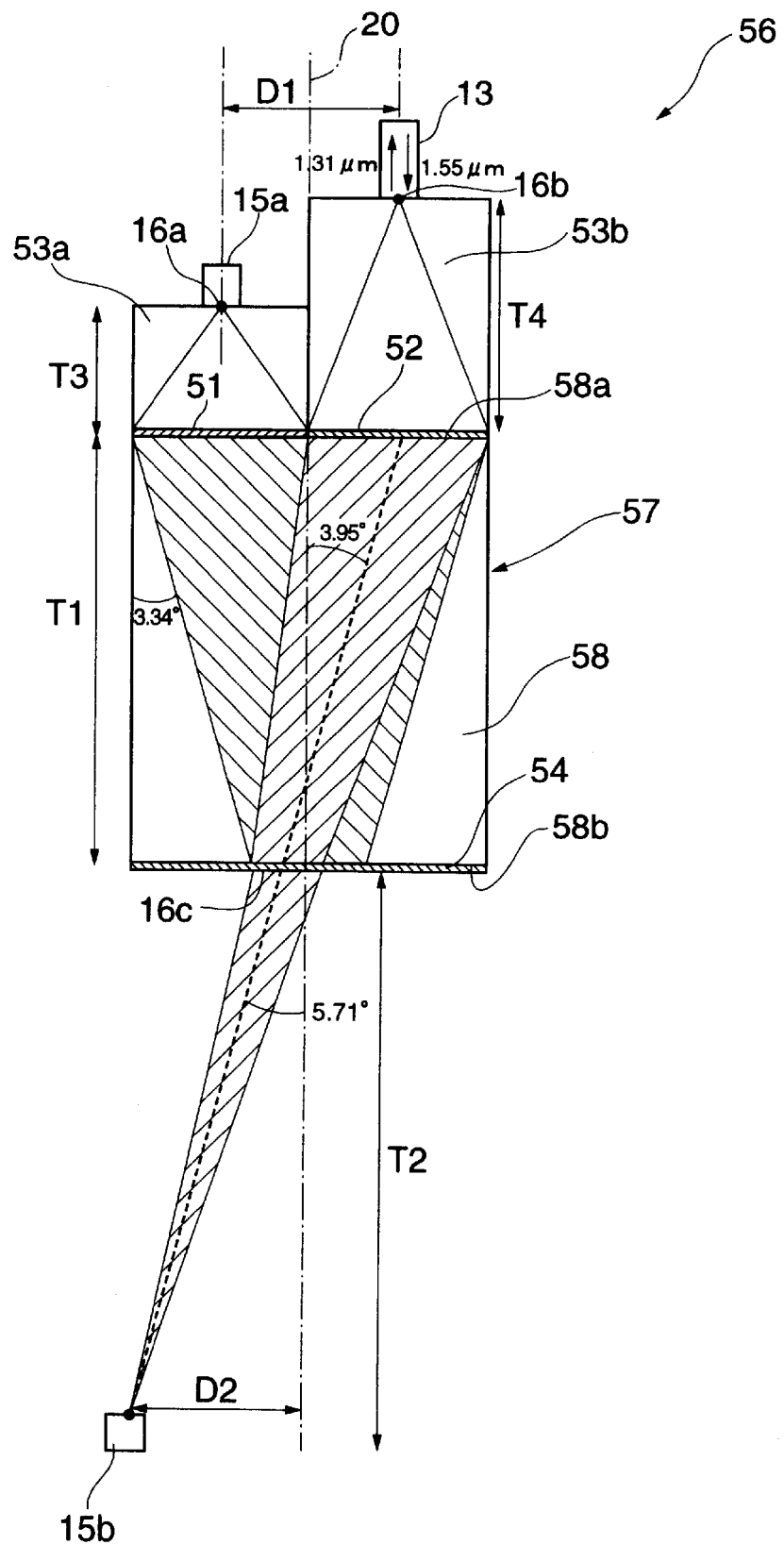
FIG. 3 is a cross-sectional view of a terminal optical apparatus provided to a home.

FIG. 3 is a cross-sectional view of an optical apparatus 56 which is provided to a home 12. The optical apparatus 56 has an optical block 57. In the example shown in FIG. 3, the optical block 57 has an optical substrate 58 being similar to that employed in the optical apparatus 16.

The optical substrate 58 is made up of a silica glass plate 58 having a thickness of 3 mm. The reference number 20 shows a central axis line of the optical block 57 in the longitudinal direction which coincides with a central axis line of the optical substrate 58.

On one surface 58a of the glass plate 58 are formed a first CGH device 51 and a second CGH device 52. The first CGH device 51 is formed on one of the halves of the surface 58a of the silica glass plate 58, the same as the first CGH device 21, and the second CGH device 52 is formed on the other of the halves of the surface 58a of the silica glass plate 58.

On the one of the halves of surface 58a of the silica glass plate 58 is formed a support section 53a in a manner such that it covers the first CGH device 51, which has the same functions as the support section 23a. On the other of the halves of surface 58a of the silica glass plate 58 is formed a support section 53b in a manner such that it covers the second CGH device 52, which has the same functions as the support section 23a.

The support section 53a with a thickness T3 of, for example, 0.75 mm is adapted to guide the diverging light with a wavelength of 1.31 μm being incident on the input terminal 16a from a light source 15a mounted on a surface of the support section 53a to the first CGH device 51. The support section 53b with a thickness T4 of, for example, 1.5 mm is adapted to guide the diverging light with a wavelength of 1.55 μm being incident on the common terminal 16b from the optical fiber 13 connected to the end surface of the support section 53b to the second CGH device 52. In the example shown in FIG. 3, a distance D1 between center portions of the input terminal 16a and the common terminal 16b is, for example, 350 μm.

On the other surface 58b of the glass plate 58 is mounted a wavelength selecting filter 54 made up of, for example, a WDM filter. The wavelength selecting filter 54 is adapted to guide the diverging light with the short wavelength transmitted from the light source 15a through the CGH device 51 and to reflect it toward the second CGH device 52 and to permit the diverging light with the long wavelength transmitted from the optical fiber 13 to pass through the second CGH device 52.

The other surface 58b of the optical substrate 58 functions as an output terminal 16c, and the light receiver 15b adapted to receive the diverging light with the short wavelength is disposed apart by a distance T2 of, for example, 3.56 mm from the other surface 58b of the optical substrate 58 and apart by a distance D2 of, for example, 356 μm from the central axis line 20.

The first CGH device 51 is provided with diffractive optic characteristics including the collimation function used to convert the diverging light with a wavelength of 1.31 μm from a light source 15a into a parallel luminous flux and the deflection function used to permit the collimated parallel luminous flux and to deflect the collimated parallel luminous flux to the second CGH device 52 via the wavelength selecting filter 54. In the example shown in FIG. 3, the light with the wavelength of 1.31 μm forms a deflecting angle of 3.34° relative to its optical axis.

The second CGH device 52, as in the case of the first CGH device 51 used to direct the collimated light of the wavelength of 1.31 μm toward the common terminal 16b, has the deflection function to form a deflecting angle of, for example, 3.34° and the light-gathering function to cause the light to converge to the common terminal 16b.

Therefore, the signal light with the wavelength of 1.31 μm from the light source 15a, that is, the signal light with the short wavelength is gathered to the common terminal 16a after being transmitted by way of the first CGH device 51, the wavelength selecting filter 54 and the second CGH device 52, and is then guided to the optical fiber 13 connected to the common terminal 16b.

Since the second CGH device 52 is provided with optical characteristics to cause the parallel luminous flux with the wavelength of 1.31 μm to converge to the common terminal 16b, when the diverging light with the wavelength of 1.55 μm transmitted from the optical fiber 13 is guided to the second CGH device 52 from the common terminal 16b, this signal light with the long wavelength, unlike the signal light with the short wavelength, does not become a parallel luminous flux and is directed as converging light to the wavelength selecting filter 54. In the example shown in FIG. 3, light with the wavelength of 1.55 μm is permitted to pass through the wavelength selecting filter 54 at a deflecting angle of 3.95° with respect to its optical axis.

The second CGH device 52, as described above, functions as a light gathering device by causing the diverging light transmitted through the common terminal 16b to converge. The diverging light from the common terminal 16b converges by being transmitted through the second CGH device 52 at a point disposed apart by a distance T2 from the other surface 58b of the optical substrate 58 and apart by a distance D2 from the central axis line 20, as described above, at a deflecting angle of, for example, 5.71° which is formed based on a difference in a refractive index between the optic substrate 58 and air. At the converging point is disposed a light receiver 15b used to receive the light from the common terminal 16b.

Thus, the optical apparatus of the embodiment, as described above, enables the signal light with the short wavelength from the light source to be suitably guided to the optical fiber 13 and enables the signal light with the long wavelength from the optical fiber to be suitably guided to the light receiver 15b. Moreover, since the optical devices having the light-gathering function to gather signal light and having the deflecting function are made up of the CGH device, it is possible to implement the compact optical apparatus 56 at low costs.

As described above, according to the present invention, by providing optical characteristics including the collimation function, light-gathering function and deflection function all together or selectively to the CGH device using diffraction and by forming the CGH device with high accuracy using the semiconductor manufacturing technology such as photolithography and photoetching, it is possible to implement the compact and economical optical apparatus for use in optical communication. Moreover, according to the present invention, by using the above economical optical apparatus for use in optical communication, it is possible to implement bidirectional optical communication system between the base station and the home at comparatively low costs.

It is apparent that the present invention is not limited to the above embodiments but may be changed and modified without departing from the scope and spirit of the invention. For example, each of the glass plates 18, 19 and 58 and the support sections 23a, 23b, 53a and 53b may be constructed of various substrate materials such as silicon substrates or plastic substrates, instead of the above-described materials for glass, only if they has a small optical loss.

Moreover, in the above embodiment, the optical communication system 10 is implemented by using the optical apparatus 16 and 56 in which the CGH devices are embedded and which are mounted on the base station 11 and the home 12, however, another optical communication system can be implemented by combining either of the optical apparatus of the present invention with conventional optical apparatus. However, in order to implement a more compact and economical optical communication system, it is possible to apply the optical apparatuses 16 and 56 of the present invention to the base station 11 and the home 12.

What is claimed is:

1. An optical apparatus for use in bidirectional optical communication comprising:

a common terminal used to receive diverging light with a long wavelength and to output light with a wavelength which is shorter than the long wavelength;

an input terminal used to receive diverging light with the short wavelength from a light source;

an output terminal used to send out light with the long wavelength to a light receiver;

a wavelength selecting filter adapted to cause said light with the long wavelength transmitted from said common terminal to pass toward said light receiver and to reflect said light with the short wavelength transmitted from said input terminal to selectively direct said light to said common terminal; and first and second computer-generated holograms used to guide said diverging light with the short wavelength transmitted from said input terminal to said common terminal via said wavelength selecting filter and to cause said light with the short wavelength to converge to said common terminal, said second computer-generated hologram additionally causing said diverging light with the long wavelength transmitted from said common terminal to converge to said light receiver, wherein said light receiver is located on one side of said wavelength selecting filter, and said common terminal, said input terminal for said light source, and said first and second computer-generated holograms are located on the other side of said wavelength selecting filter.

2. The optical apparatus for use in bidirectional optical communication according to claim 1, further comprising an optical block, wherein said common terminal and said input terminal are disposed adjacent one end of said optical block, said output terminal is disposed at a position spaced apart from the other end of said optical block, and said wavelength selecting filter is mounted on said other end of said optical block, with said other side of said wavelength selecting filter facing said optical block.

3. The optical apparatus for use in bidirectional optical communication according to claim 2, wherein said common terminal and input terminal are defined by support sections, which are mounted on the one end of said optical block, said support sections having different thicknesses.

4. The optical apparatus for use in bidirectional optical communication according to claim 1, wherein said first computer-generated hologram has a function of converting said diverging light with the short wavelength into a parallel luminous flux and of deflecting it, and wherein said second computer-generated hologram is optimized so as to deflect said parallel luminous flux converted from said light with the short wavelength toward said common terminal and to cause said parallel luminous flux to converge to said common terminal.

5. An optical apparatus for use in bidirectional optical communication comprising:

a common terminal used to receive diverging light with a short wavelength and to output light with a long wavelength which is longer than the short wavelength;

an input terminal used to receive diverging light with the long wavelength from a light source;

an output terminal used to send out light with the short wavelength to a light receiver;

a wavelength selecting filter adapted to cause said light with the short wavelength transmitted from said common terminal to pass toward said output terminal and to reflect said light with the long wavelength transmitted from said input terminal to selectively direct said light with the long wavelength to said common terminal;

first and second computer-generated holograms used to guide said diverging light with the long wavelength transmitted from said input terminal to said common terminal via said wavelength selecting filter and to cause said light with the long wavelength to converge; and a third computer-generated hologram used to cause said light with the short wavelength transmitted from said common terminal through said second computer-generated hologram to converge to said output terminal, wherein said light receiver and said third computer-generated hologram are located on one side of said wavelength selecting filter, and said common terminal, said input terminal for said light source, and said first and second computer-generated holograms are located on the other side of said wavelength selecting filter.

6. The optical apparatus for use in bidirectional optical communication according to claim 5, further comprising a pair of optical blocks, wherein said common terminal and said input terminal are disposed adjacent a first end of one of said optical blocks, said output terminal is disposed at a first end of the other of said optical blocks, each of said optical blocks additionally has a second end, and said wavelength selecting filter is disposed between said second ends of said optical blocks.

7. The optical apparatus for use in bidirectional optical communication according to claim 6, wherein said common terminal and input terminal are defined by support sections, which are mounted on the first end of said one of said optical blocks, said support sections having different thicknesses.

8. The optical apparatus for use in bidirectional optical communication according to claim 5, wherein said first computer-generated hologram has a function of converting said diverging light of the long wavelength into a parallel luminous flux and deflecting it, wherein said second computer-generated hologram is optimized so as to deflect said parallel luminous flux converted from said light with the long wavelength toward said common terminal and to cause said parallel luminous flux to converge, and wherein said diverging light with the short wavelength transmitted from said common terminal, after having been dispersed by said second computer-generated hologram, is converged to said light receiver by said third computer-generated hologram.

9. An optical communication system implementing bidirectional optical communication between a base station and a home and wherein said base station is provided with said optical apparatus stated in claim 5 and said home is provided with an optical apparatus that comprises a common terminal used to receive diverging light with a long wavelength and to output light with a wavelength which is shorter than the long wavelength;

an input terminal used to receive diverging light with the short wavelength from a light source;

an output terminal used to send out light with the long wavelength to a light receiver;

a wavelength selecting filter adapted to cause said light with the long wavelength transmitted from said common terminal to pass toward said light receiver and to reflect said light with the short wavelength transmitted from said input terminal to selectively direct said light to said common terminal; and first and second computer-generated holograms used to guide said diverging light with the short wavelength transmitted from said input terminal to said common terminal via said wavelength selecting filter and to cause said light with the short wavelength to converge to said common terminal, said second computer-generated hologram additionally causing said diverging light with the long wavelength transmitted from said common terminal to converge to said light receiver, wherein said light receiver is located on one side of said wavelength selecting filter, and said common terminal, said input terminal for said light source, and said first and second computer-generated holograms are located on the other side of said wavelength selecting filter, and wherein both of said common terminals of said optical apparatuses are connected through an optical fiber to each other.

* * * * *